R. F. Hunt,
Dentists' Chair.
No. 109,411. Patented Nov. 22, 1870.

Witnesses:
R. H. S. Thompson
R. M. Dawes.

Inventor:
Robert Finley Hunt

United States Patent Office.

ROBERT FINLEY HUNT, OF WASHINGTON, DISTRICT OF COLUMBIA.

Letters Patent No. 109,411, dated November 22, 1870; antedated November 5, 1870.

IMPROVEMENT IN DENTISTS' RESTS.

The Schedule referred to in these Letters Patent and making part of the same.

I, ROBERT FINLEY HUNT, of the city and county of Washington, in the District of Columbia, have invented an Adjustable "Dentists' Rest" or Support, of which the following is a specification.

Nature and Objects of the Invention.

The object of my invention is to provide a rest or support for the body and arm of dentists while operating on the teeth of their patients, and thus avoid and prevent the great strain and fatigue of the muscles heretofore consequent upon the stooping and constrained positions they are compelled to be in, frequently for a great length of time. To accomplish this I have provided cushions, one for the body and one for the arm, to be attached to the operating-chair, or fastened to the floor near it, and capable, by suitable devices, of being so adjusted as to furnish a rest or support to the dentist in any required position.

Description of the Accompanying Drawing.

Figure 1:
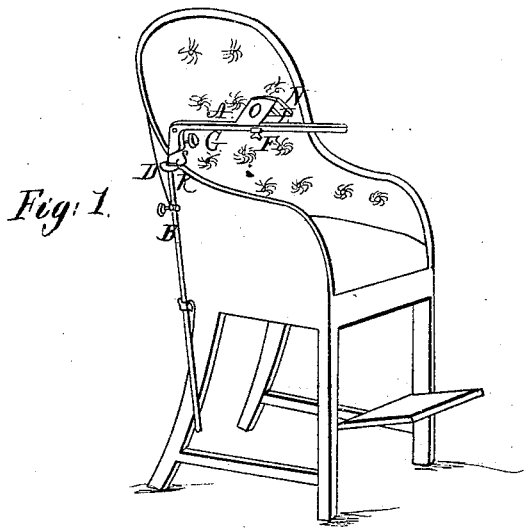
Figure 2:
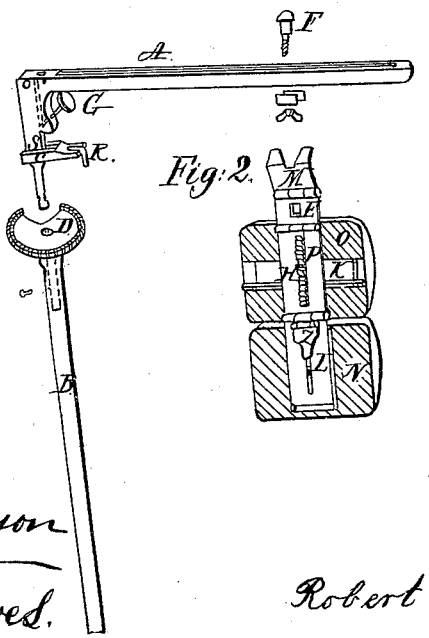

Figure 1 shows the dentists' rest attached to a chair.
Figure 2 shows in detail the various parts mentioned, and designated by letters in the general description.

General Description.

The whole apparatus forming the dentists' rest is attached to the operating-chair, as shown in the drawing, by staples of variable dimensions, in which the bar B moves freely up and down, and can be fixed at any desired altitude by means of the clamp-screw working in the upper staple. This bar B is made of steel, iron, brass, or other suitable material, and is preferably made hollow for stiffness and lightness. To prevent its turning in the staples, it is partially flattened throughout its length, except two or three inches at the upper end, which is left round, and its interior surface for that length made true and smooth.

Rigidly attached to the upper end of this round part, and concentric with it, is the circular disk D, also made of suitable material, having its outer edge provided with teeth or cogs, or their equivalent. A variable portion of this disk may be cut out, and the bar may be bent at the junction of the flattened and round parts, to suit the shape of the chair to which the rest is attached.

The shaft or stem S, made also of steel, iron, or other suitable material, has its upper part flattened for about two-thirds of its length, and the remainder round, with a beveled shoulder to the round part where it joins the flattened. The lower or round part of the shaft S is made so as to fit accurately and rotate freely in the upper or round part of the bar B, the beveled shoulder on the former fitting in a countersink in the latter. A screw or other stop, projecting through B into a grooved turned in S, near its lower extremity, prevents its withdrawal from B, except at pleasure.

C is a catch or stop, also of suitable material, made with a slot to fit accurately in width, but not in length, over the flattened part of the shaft S.

Its outer end is provided with teeth or their equivalent, to fit into the teeth, cogs, or equivalent of the disk D.

This outer end of the catch C has an apron, represented by the rod R, rigidly attached to it, which answers two purposes: one to keep the catch C in its proper relation to the disk D, and the other to serve as a handle to operate the catch. The function of the catch C is, by engaging its teeth or equivalent with the teeth, cogs, or equivalent of the disk D, to stop and retain the shaft S, with its attachments, at any desired point in its rotation. When greater nicety of adjustment is required, I enlarge the size of the teeth or cogs in the disk D, and equally the spaces between them, and insert in the outer end of the catch C, in lieu of the teeth, a tangent-screw with a square thread to work in the enlarged teeth of the disk.

The slotted arm A, also of iron, steel, or other suitable material, is attached to and pivoted on the upper part of the shaft S in such a manner that, when the shaft S rotates, it carries the slotted arm A with it in a circular movement; and when it is stopped and retained at any desired point by the catch C, the outer end of the slotted arm A can be raised or lowered by means of the screw G, which works in a downward extension of the inner end of the slotted arm A, and against the edge of the flattened part of the shaft S. This is necessary on account of the different inclination of different chairs, and the different inclination of the same chair when thrown back.

The carrier E, also of suitable material, sustaining the cushions, has a slot in it, through which a clamp-screw, F, with a broad head, works, as well as through the slot in the arm A. The clamp-screw F has a thumb-nut at its lower end, and a tram-washer, the sides of which extend up, and by embracing prevent the spreading of the sides of the slotted arm A. The carrier E can be moved in the direction of the slot in it, as well as of the slot in the arm A, and can be rotated so as to place the face of the cushions it sustains in any required direction.

To one end of the carrier E is hinged a plate or bar, P, also of suitable material, moving on the hinge in a vertical plane, and having rigidly attached to it, on the outside, in the middle, at right angles, a double-beveled plate or slide, K, on which the body-cushion O, by a suitable device, slides laterally.

On the inner side of the plate P, and longitudinally with it, is a ratchet, H, with a double set of teeth.

Hinged to the other end of the carrier E is a movable brace, M, which, by engaging the teeth of the lower set in the ratchet H, supports and retains the plate P, with the body-cushion O, at any desired inclination.

Attached to the upper end of the plate P, by a hinge, and working in the same vertical plane as P and M, is another slide, L, on which the arm-cushion N slides in the same vertical plane. Suitable stops, as shown in the drawing, prevent both these cushions from moving too far or coming off the slides.

On the under side of the slide L is hinged a pawl, Z, which, by engaging the teeth of the upper set in the ratchet H, supports and retains the arm-cushion N at any desired inclination.

*Claims.*

I claim as my invention—

1. The combination of the bar B, the disk D, the shaft S, and arm A, the catch C, the carrier E, the plate P, the cushion O, and the clamp-screw F, arranged and operated substantially as herein described.

2. The adjustable dentists' rest, herein described, consisting substantially of the bar B, the toothed disk D, the shaft S, the catch C, the rod R, the arm A, the screw G, the carrier E, the clamp-screw F, the plate P, the slides K and L, the cushions O and N, the ratchet H, the brace M, and the pawl Z, or their equivalents, arranged and operated substantially as and for the purpose hereinbefore set forth.

ROBERT FINLEY HUNT.

Witnesses:
R. H. S. THOMPSON,
R. M. DAWES.